March 6, 1973     S. S. FOX ET AL     3,718,972

DENTAL CONSOLE

Filed April 12, 1971     6 Sheets-Sheet 1

INVENTORS
Shirl S. Fox
BY    David M. Hershkowitz
Flehr, Hohbach, Test,
Albritton & Herbert
Attorneys

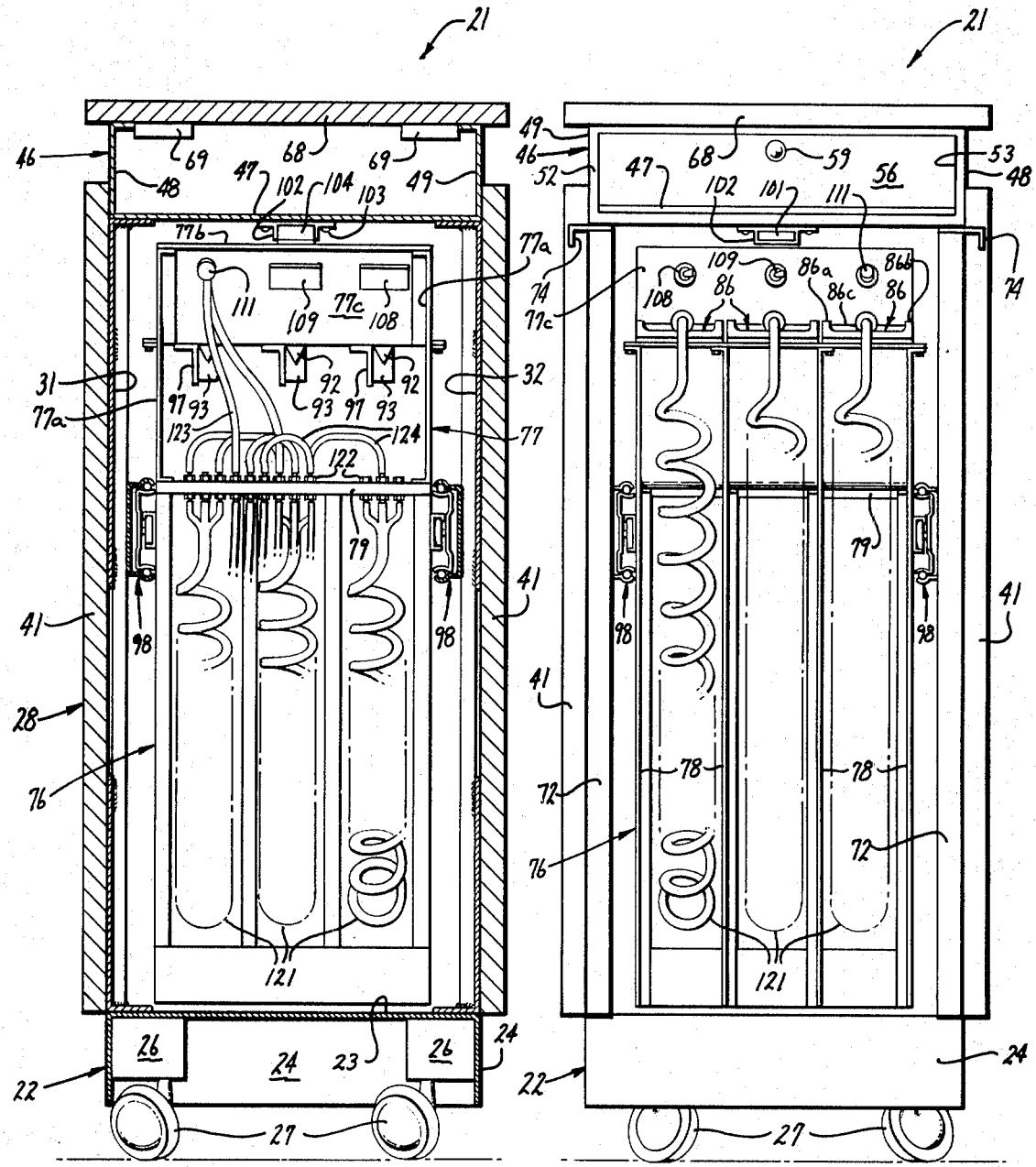

United States Patent Office 3,718,972
Patented Mar. 6, 1973

3,718,972
DENTAL CONSOLE
Shirl S. Fox, Menlo Park, and David M. Hershkowitz, Palo Alto, Calif.; said Fox assignor to Dental Designs, Palo Alto, Calif.
Filed Apr. 12, 1971, Ser. No. 132,979
Int. Cl. A61c 19/02
U.S. Cl. 32—22                                  14 Claims

ABSTRACT OF THE DISCLOSURE

Dental console having a cabinet with a plurality of dental instruments mounted in the cabinet and with the cabinet being adapted to be connected to a source of at least first and second fluids. A plurality of separate trays are mounted in the cabinet with one of the dental instruments being mounted in each tray. Switch means is associated with each tray for controlling the supply of fluid to the dental instrument carried by the tray.

BACKGROUND OF THE INVENTION

In copending application Ser. No. 889,471, filed Dec. 31, 1969, there is disclosed a dental console which can be characterized as a "Her" unit. This designation has been applied to this type of console because typically it is utilized by the dental assistant who is assisting the dentist. It has been found that very often the dentist requires additional dental instruments which he can use independently of the dental assistant to thereby increase this output. There is, therefore, a need for a new and improved dental console which is particularly adapted for the needs of the dentist.

SUMMARY OF THE INVENTION AND OBJECTS

The dental console consists of a cabinet which is adapted to be connected to a source of at least two fluids such as air and water. A plurality of dental instruments are mounted within the cabinet and are adapted to be connected to said sources of fluid. A plurality of separate trays are mounted in the cabinet with one of the dental instruments being carried by each of the trays. Means is provided for controlling the flow of fluids to the dental instruments and includes switch means associated with each of the trays whereby when a dental instrument is lifted from the tray, fluid can be supplied to the dental instrument under the control of a foot operated switch.

In general, it is an object of the present invention to provide a dental console which can be readily used by a dentist.

Another object of the invention is to provide a dental console of the above character which can be utilized in conjunction with a dental console for the dental assistant.

Another object of the invention is to provide a dental console of the above character in which all of the dental instruments are capable of being disposed within a cabinet when not in use.

Another object of the invention is to provide a dental console of the above character in which the dental instruments are carried on trays.

Another object of the invention is to provide a dental console of the above character in which fluid control for a dental instrument is transferred to a foot control when the dental instrument is lifted off of the tray.

Another object of the invention is to provide a dental console of the above character which can be readily moved from one location to another.

Another object of the invention is to provide a dental console of the above character in which sit-down dentistry can be utilized.

Another object of the invention is to provide a dental console of the above character in which the dentist can readily take up and replace dental instruments without looking at the trays carrying the same.

Another object of the invention is to provide a dental console of the above character which is functional and has excellent esthetic qualities.

Additional objects and features of the invention will appear from the following description in which the preferred embodiment is set forth in detail in conjunction with the accompanying drawing.

BRIEF DESCRIPTION OF THE DRAWINGS

FIG. 2 is a front elevational view of the dental console shown in FIG. 1.

FIG. 3 is a cross-sectional view of the dental console.

DESCRIPTION OF PREFERRED EMBODIMENT

Figure 1:
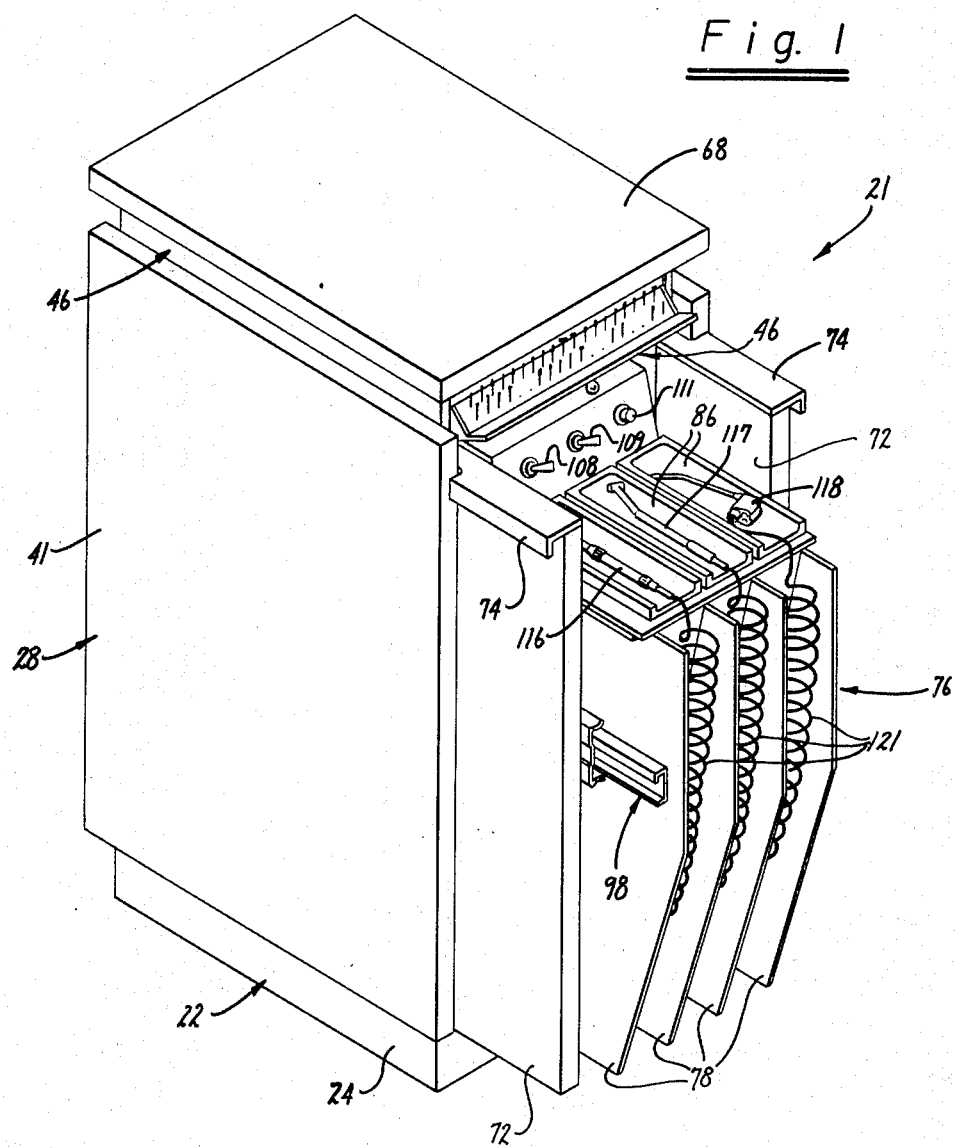
FIG. 1 is an isometric view of a dental console incorporating the present invention showing the trays carrying the dental instruments in a rolled-out position.

The dental console incorporating the present invention consists of a cabinet 21 which can be termed a "His" unit because it is a dental console of the type which is adapted to be utilized primarily by the dentist himself, whereas the dental console described in copending application Ser. No. 889,471, filed Dec. 31, 1969, is intended primarily to be utilized by the dental assistant and, therefore, can be characterized as a "Her" unit.

The cabinet 21 consists of a base 22 formed of a suitable material such as sheet metal. The base consists of a planar top wall 23 with a rectangular depending skirt 24. Four blocks 26 are secured to the bottom surface of the top wall 23 and have mounted therein caster assemblies 27 of a conventional type. The caster mounting for the base permits the base 22 to be readily moved from one location to the other.

The cabinet 21 also consists of a box-like enclosure 28. The enclosure is formed by a pair of spaced parallel upstanding side walls 31 and 32 and an upstanding end wall 33 which is secured to the side walls 31 and 32. The end wall 33 is provided with an opening 34 which is normally closed by a cover 36 held in place by screws 37. The screws 37 extend through a rectangular framework 38 mounted around the opening 34 (see FIG. 4). The side walls 31 and 32 and end wall 33 are formed of a suitable material such as sheet metal. Spaced vertical support members 39 are provided on the inside surface of each of the side walls 31 and 32. Decorative panels 41 are mounted on the outer surfaces of the walls 31 and 32.

The cabinet 21 also includes a top framework or enclosure 46 which consists of a bottom wall 47 that is mounted upon the enclosure 28. Spaced and parallel side walls 48 and 49 are secured to the bottom wall 47 and a rear wall 51 is secured to the side walls 48 and 49 and the bottom wall 47. The top framework 46 is also provided with a front wall 52. Front wall 52 is provided with a rectangular opening 53 in which there is mounted a V-shaped dental bur tray 54. The V-shaped tray 54 is formed of a suitable material such as metal and is provided with two legs 56 forming the V. The tray 54 is pivotally mounted on the top framework 46 so that it can be swung between open and closed positions with respect to the front wall 52 by hinge means in the form of a piano hinge 57 having one of the legs 56 secured to one leaf of the hinge and having the other leaf of the hinge secured to the bottom wall 47. A ball 59 is secured to the outer leg 56 and serves as a handle for use in moving the tray 54 between open and closed positions. A block 61 formed of a suitable material such as polyurethane foam is mounted within the tray 54. The block 61 is provided with two parallel rows of spaced holes extending longitudinally of the block which are adapted to receive dental burs which are used by the dentist. The tray is mounted in such a manner that it will be retained in a closed position by the force of gravity or, alternatively, in the open position, by the force of gravity by one of the legs in each position engaging the top portion of the front wall 52 adjacent the opening 53.

The top framework 46 also includes a top wall 66 which is mounted upon the side walls 48 and 49 as well as the rear wall 51 and the front wall 52. The top wall is provided with a large rectangular opening 67. A counter or top 68 formed of a suitable material such as synthetic marble is carried by the top wall 66. A plurality of blocks 69 are secured to the lower side of the counter 68 and are positioned in such a manner that they will fit within the opening 67 provided in the top wall 66 and serve to retain the counter 68 in such a manner that it cannot be moved longitudinally or sidewise of the top framework 46.

The enclosure 28 is provided with a front opening 71 which is adapted to be closed by a pair of swinging doors 72 formed of a suitable material such as wood-grained Formica which are mounted upon the side walls 31 and 32 by piano-type hinges 73.

Hand grips 74 are mounted on the tops of the doors 72 by suitable means such as screws 75 and are provided for opening and closing the doors.

A slidable framework 76 is mounted in the enclosure 28 and is movable into and out of the front opening 71. The slidable framework 76 consists of a rectangular box 77 with an open top side. A plurality of spaced parallel, substantially vertical dividers 78 are secured to the bottom of the box 77. The dividers 78 are provided with frontal inturned portions 78a so that the dividers 78 will not have sharp front edges. The dividers 78 are also fastened together by a top cross piece 78 and a bottom cross piece 81. The box 77 has upwardly extending portions 77a, a horizontal portion 77b and a downwardly and outwardly inclined portion 77c.

A tray 86 is provided for each space between each pair of dividers 78 and thus as shown in the drawings, there are three separate trays provided for use with the four dividers 78. Means is provided for supporting the trays and consists of a plate 88 overlying the open end of the box 77. The plate 88 is provided with a pair of registration pins (not shown) on its bottom side which seat in holes (not shown) provided in a horizontal lip 77d formed as a part of the box 77. Each of the trays 86 is pivotally mounted upon the plate 88 by suitable means such as a hinge 89 which is secured to the plate 88 and which is also secured to the tray 86 at a point so that when the tray is empty, it will by the force of gravity be urged downwardly to the rear. An open space 91 is provided within the box 77 to the rear of the hinge 89 to permit the rear end of the tray to pivot downwardly through the opening 91. The tray 86 is provided with a weight or counterbalance 92 to ensure that the rear end of the tray will move downwardly when the tray 86 is empty.

Figure 4:
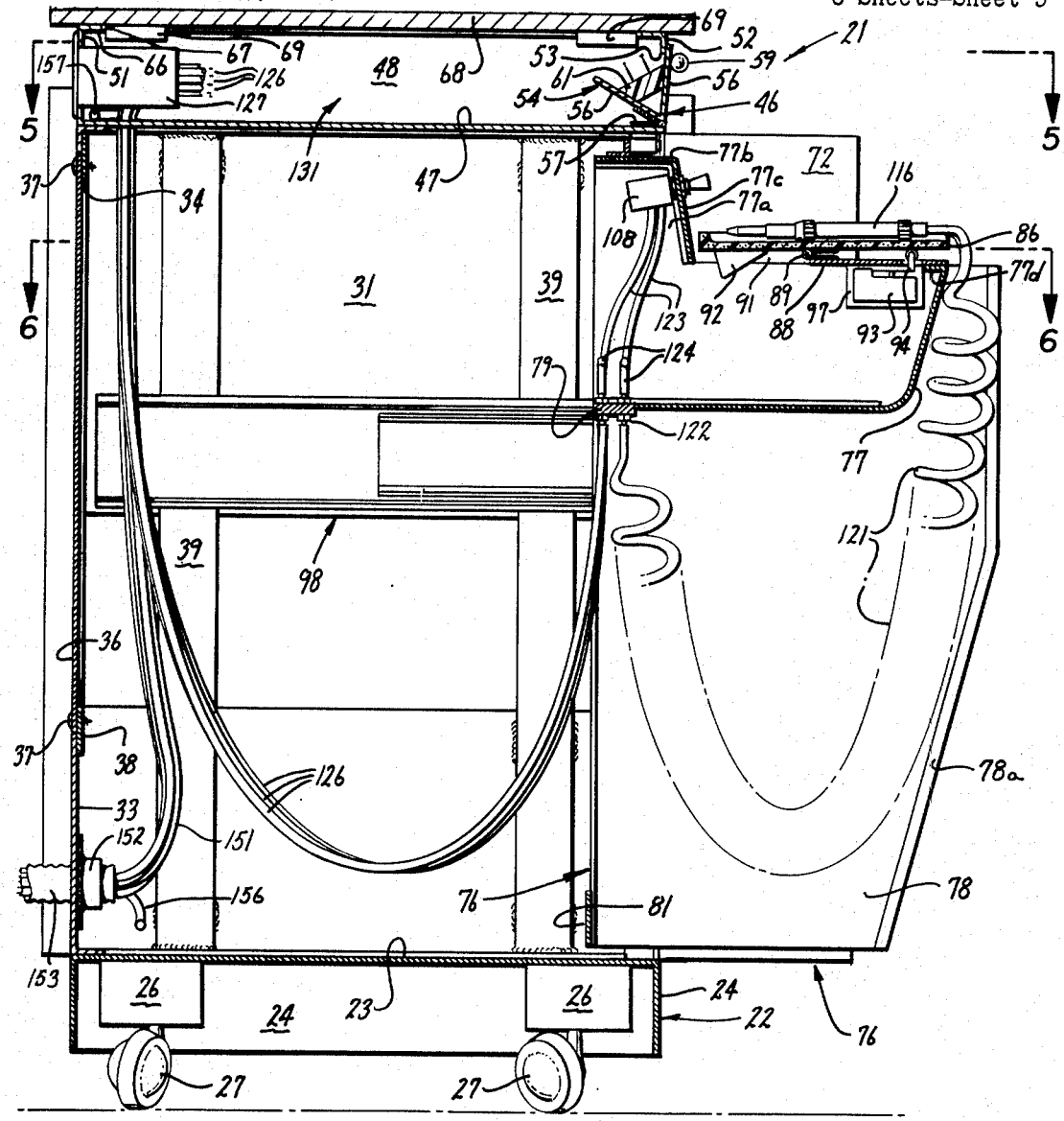
FIG. 4 is a cross-sectional view in side elevation of the dental console.

Means is provided for sensing when an article is not being carried by certain of the trays 86 and consists of a microswitch 93 for each such tray which has an operating arm 94 that extends through a hole 96 in the plate 88. The operating arm 94 is adapted to be engaged by the bottom side of the tray 86 as shown in FIG. 4. The microswitches 93 are carried by small L-shaped brackets 97 secured to the plate 88 by screws 95.

Means is provided for permitting the slidable framework 76 to move in and out of the enclosure 28 and consists of slide assembles 98 which are mounted on the support members 39 and engage the outer two dividers 78 to support the framework 76 and to permit the framework 76 to be moved between the position in which it is within the enclosure 28 and a position which is substantially out of the enclosure 28 as shown in FIG. 4. Means is provided for limiting the outermost travel of the framework 76 and for holding it in an outermost position and consists of a magnetic latch 101 carried by a bracket 102 secured to the bottom wall 47 by screws 103. The latch 101 is adapted to be engaged by an angle member 104 secured to the box 77. As will be noted, the latch 101 extends from both sides of the bracket 102 and can be used for retaining the doors 72 in a closed position. Alternatively, a separate magnetic latch can be provided on the bottom of the enclosure 28 for retaining the doors in a closed position.

The trays 86 are generally rectangular as shown in FIG. 1 and are provided with spaced integral upwardly extending side wall portions 86a and 86b and an upwardly extending rear wall portion 86c. The front end of the tray is open as shown in FIG. 1. In the normal position of the trays when carrying articles, the trays are sloped slightly to the rear so that articles carried thereon will not slide off of the trays.

Three separate controls 108, 109 and 111 are provided. Control 108 is utilized for turning the air supply on and off and the control 109 is utilized for selecting the coolant, i.e. whether air or water. The control 111 is in the form of a control knob and is provided for controlling the water pressure supplied to the dental instruments or pieces hereinafter described. The trays 86 are adapted to carry tools or instruments which are to be used by the operator or user of the console. For example, the trays can carry dental pieces or instruments as shown in FIG. 1 in the form of a low speed hand piece 116 on the tray on the left, a high speed hand piece 117 on the middle tray and an air-water syringe 118 on the right hand tray. The air-water syringe is of a conventional type and is provided with its own separate controls for the air and water on the syringe itself. For that reason, the tray 86 on which the syringe is mounted need not be provided with a microswitch 93 to control the flow of fluid to the syringe.

Each of the dental pieces is connected by a flexible cord 121 to necessary supply sources such as air or water. As can be seen from the drawings, when the dental pieces are in place on the trays 86, the cords 121 loop downwardly in a generally V-shaped or U-shaped configuration between the dividers 78 and are connected to a plurality of fittings 122 carried by the cross piece 79. Tubes 123 are provided for connecting the fittings 122 to the control devices 108, 109 and 111 and jumper tubes 124 are provided for connecting the various sources to the cords 121. Thus is can be seen that the fittings 122 and the interconnecting tubes form a distribution manifold.

Figure 5:
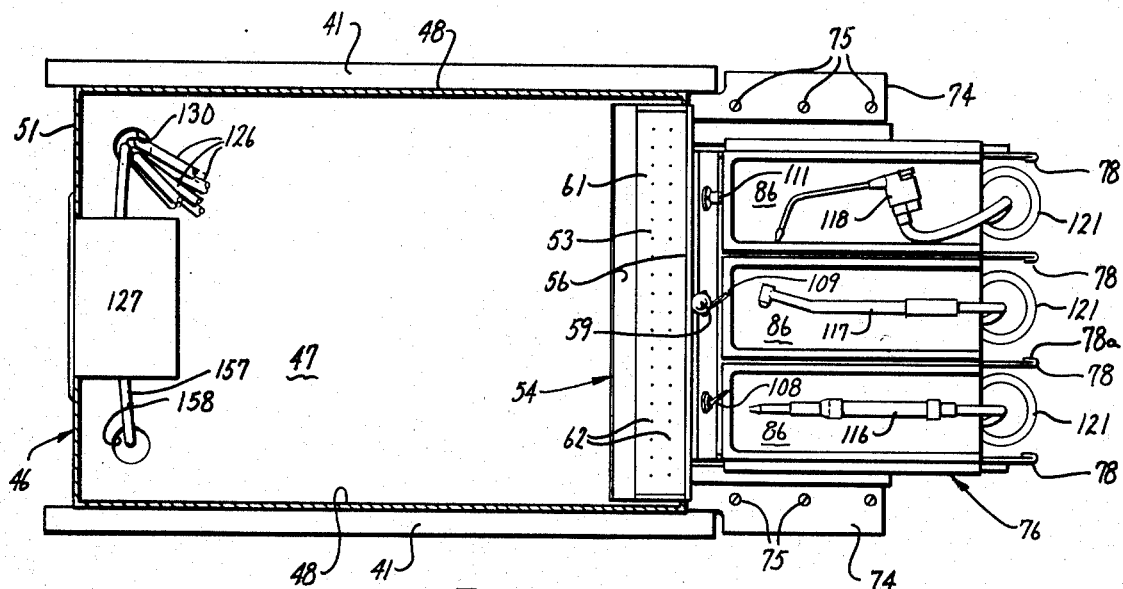
FIG. 5 is a cross-sectional view taken along the line 5—5 of FIG. 4.
Figure 6:
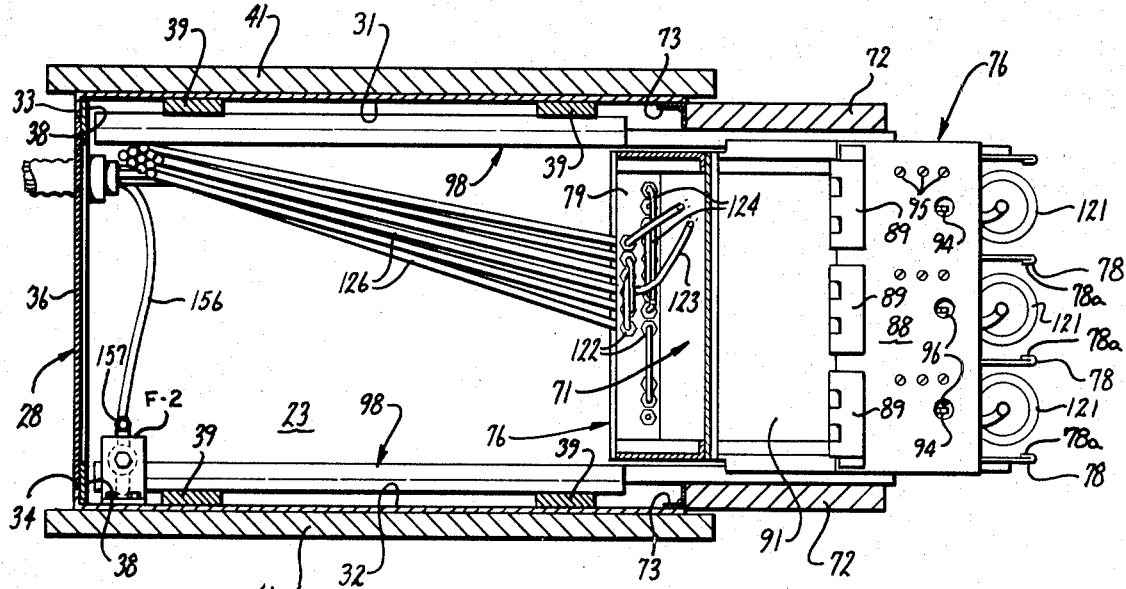
FIG. 6 is a cross-sectional view taken along the line 6—6 of FIG. 4.
Figure 7:
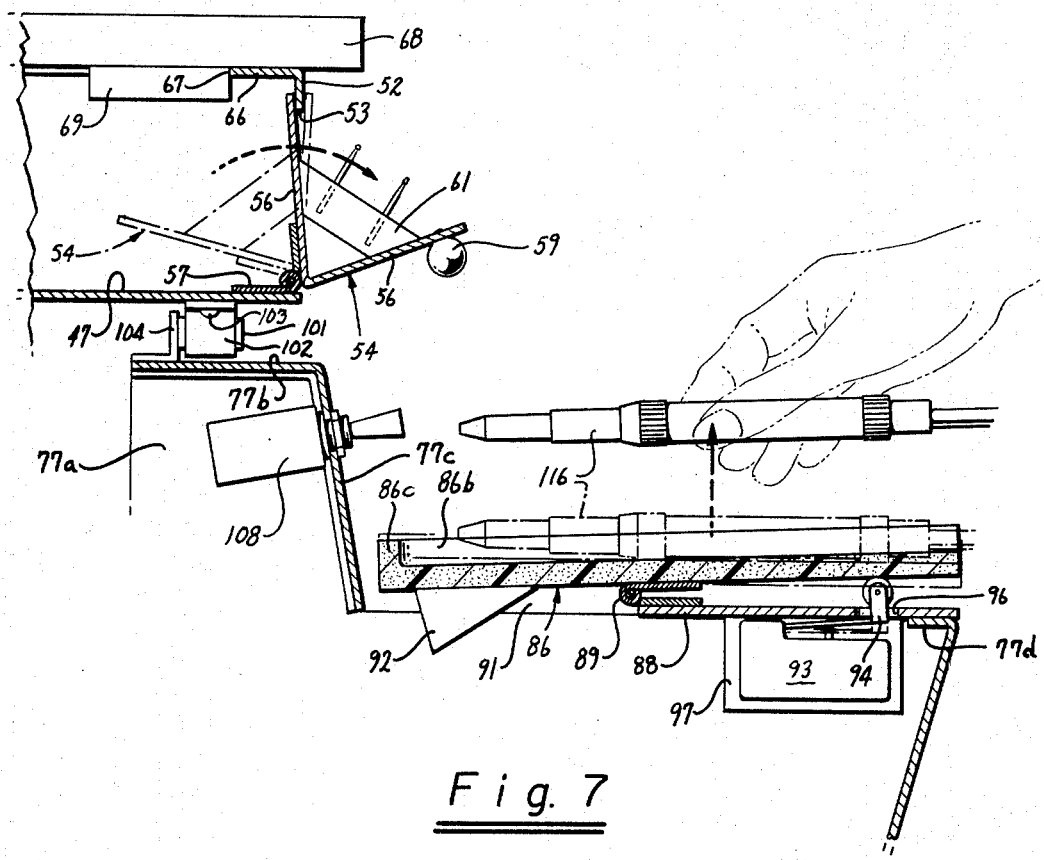
FIG. 7 is an enlarged cross-sectional view of a portion of the dental console showing a tray with a dental tool or instrument and the manner in which the dental tray operates the switch means associated with the tray.
Figure 8:
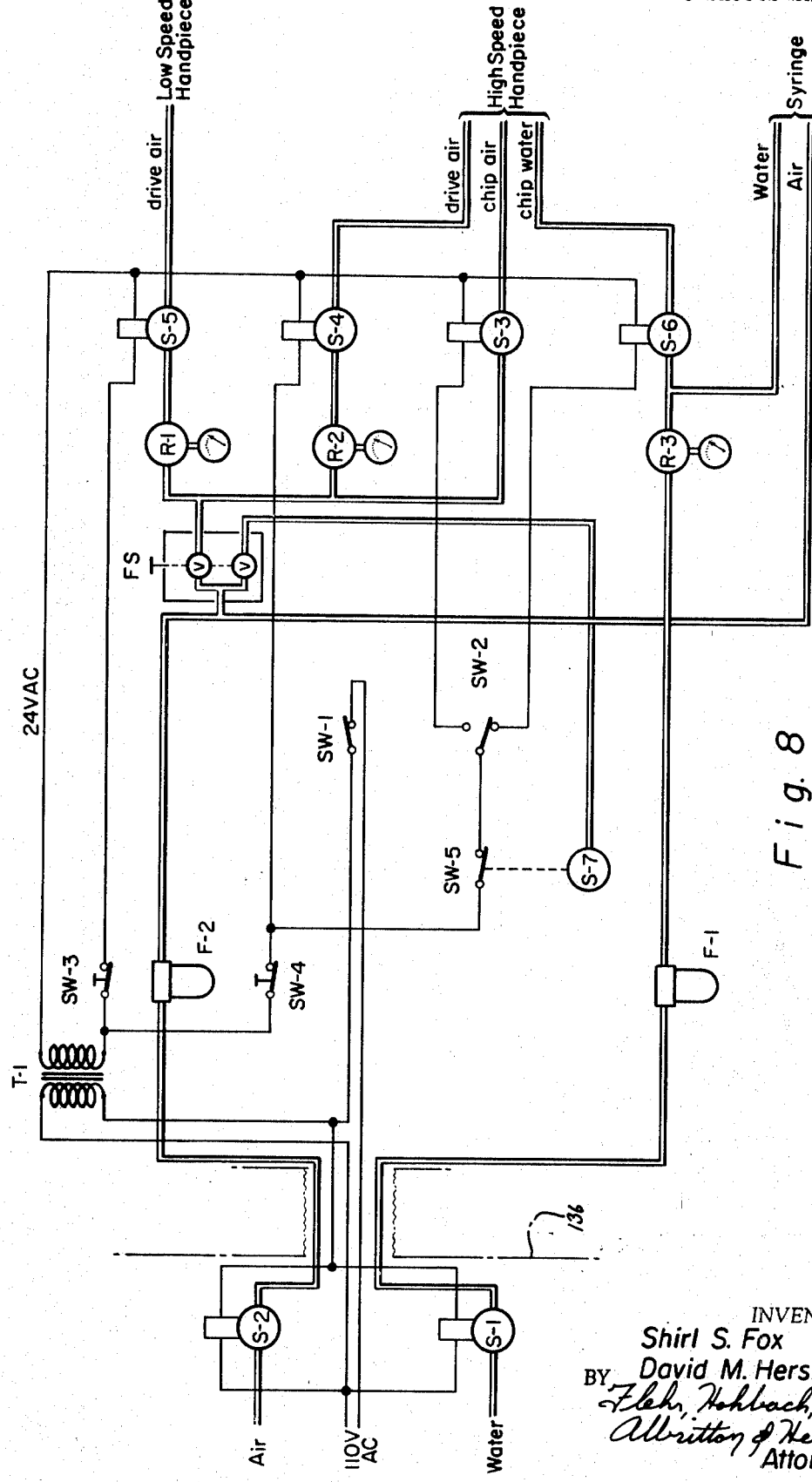
FIG. 8 is a general schematic diagram of the control system utilized in the dental console.

A plurality of additional tubes 126 are connected to the fittings 122 and extend downwardly in a big loop within the enclosure 28 as shown in FIG. 4 and extend upwardly through a hole 130 (see FIG. 5) into compartment 131 formed within the top framework 46 as shown in FIG. 8. A junction box 127 is provided in the compartment 131 for the necessary electrical connections. Provided in the compartment 131 are the following items which are interconnected in the manner shown.

Solenoid operated valve S–1—main water
Solenoid operated valve S–2—main air
Solenoid operated valve S–3—chip air for high speed hand piece Solenoid operated valve S-4—drive air for high speed hand piece
Solenoid operated valve S-5—drive air for high speed hand piece
Solenoid operated valve S-6—chip water for high speed hand piece
Solenoid operated valve S-7—operates switch S-5

The solenoid operated valves S-1 and S-2 are preferably mounted outside of the compartment 131, as for example, they can be mounted behind the wall in a dentist's office or below the floor. In FIG. 8, they have been shown mounted behind a wall 136.

Regulator R-1 for controlling the low speed drive air
Regulator R-2 for controlling high speed drive air
Regulator R-3 for controlling the pressure of the water to the syringe A filter F-1 is provided for filtering the water and a filter F-2 is provided for filtering the air which are utilized in the dental console. In addition, there is provided a foot switch FS.

The electrical circuitry includes a transformer T1 for converting the 110-volt AC to 24 volts AC. A switch SW-1 is provided which is operated by the control lever 108 shown in FIG. 1. Similarly, there is provided a switch SW-2 which is operated by the control lever 109. This is provided for selecting the coolant for the high speed hand piece, whether it be air or water. Switch SW-3 corresponds to microswitch 93 operated by the tray 86 carrying the low speed hand piece and the switch SW-4 corresponds to the microswitch 93 for the tray carrying the high speed hand piece. The switch SW-5 is controlled by the solenoid S-7.

A plurality of tubes 151 extend downwardly through the hole 130 in the compartment 131 within the enclosure 28 and extend through a fitting 152 provided in the rear wall 33. The tubes 151 are enclosed in a covering 153 to form what may be called an umbilical cord for the console. This umbilical cord is adapted to be connected to the desired sources of supply for the console as, for example, a source of water under pressure and a source of air under pressure as shown in FIG. 8. Another tube 156 is connected to the source of air under pressure and is connected to the filter F-2. A tube 157 connected to the filter F-2 extends through a hole 158 in the bottom wall 47 into the compartment 131.

Operation and use of the dental console may now be briefly described as follows. Let it be assumed that the dentist desires to practice sit-down dentistry of the type described in copending application Ser. No. 889,471, filed Dec. 31, 1969. The dental assistant will be using the "Her" unit described in Ser. No. 889,471 and the dentist himself will be utilizing the unit described in the present application. The dentist can move the console to the desired position. He can open the doors 72 and pull out the slidable framework 76 to expose the dental tools carried on the trays 86. The dentist then turns on the water and air supply and then selects the desired coolant, whether air or water is to be utilized. The dental tools are now ready for use. Let it be assumed that the dentist wishes to utilize the high speed hand piece 117. As soon as the dentist lifts the high speed hand piece from the tray, the tray 86 will tilt downwardly to the rear as shown in FIG. 4 to permit operation of the microswitch SW-4 which, through the controls provided in the top framework 46, transfers control to the foot control FS which can be operated by the dentist to cause operation of the high speed hand piece. When use of the high speed hand piece has been completed, the dentist replaces the same on the tray which causes the front end of the tray to be moved downwardly to operate the microswitch SW-4.

As soon as the next dental piece or instrument is raised from the tray, that dental piece will be under the control of the foot control utilized by the dentist. In this way, it can be seen that the console automatically transfers control of the desired hand piece to the foot control without any additional operation on the part of the dentist. It is merely necessary for the dentist to lift up the desired hand tool and it is immediately ready for use.

The trays are in a generally horizontal position which permits the dentist to place the dental tools on the tray with great ease. In fact, with a little experience, the dentist can place the dental tools on the trays without the necessity of watching his hands. The surface is relatively large so that the dentist can place a dental tool on the tray while still carrying on operations on the patient's mouth with the other hand. This feature alone increases the productivity of the dentist. The tools are always readily accessible and can be readily picked up and are immediately ready for the operation to be performed. The cords for the dental tools are separated from each other by the dividers 78 and do not become entangled with each other. In addition, the cords are mounted in such a manner so that they do not impede use of the dental tool by the dentist. The cords and the various tubes in the dental console are mounted in such a manner that the slidable framework 76 can be readily moved in and out of the enclosure without any danger of entangling the tubes. Operation of the switch S-1 which corresponds to the control handle 108 serves as a main power switch and serves to supply electrical power to the circuitry as shown in FIG. 8.

The dentist selects the coolant by operating the control lever 109 to the desired position to select either air or water for cooling. Thus, with the switch SW-2 in the position shown in FIG. 8, the coolant for the high speed piece is water. Thus, when the high speed hand piece is lifted from the tray the switch SW-4 is closed to energize the solenoid S-4 which permits high speed drive air to be supplied to the high speed dental instrument as soon as the foot switch FS is operated by the dentist. Similarly, when the low speed hand piece is picked up from the tray, the switch SW-3 is operated to energize the solenoid S-5 so that when the foot switch FS is operated drive air will be supplied to the low speed hand piece. Thus, as soon as either the low speed hand piece or the high speed hand piece is lifted from a tray, it is ready to be placed into operation by operation of the foot switch FS. As pointed out above either water or air can be utilized for cooling the high speed hand piece. In addition, there is provided a water and air supply for the syringe. As pointed out, the springe carries separate and independent controls for the water and air which can be controlled by the dentist.

When the use of the dental console is completed, the control handles 108 and 109 can be switched to desired positions, and thereafter the framework can be returned to within the enclosure 28, after which the doors 72 can be closed. Then, if necessary, the console can be wheeled to an out-of-the-way position.

It is apparent from the foregoing that there has been provided a dental console which is particularly adapted for use by the dentist and makes feasible four-hand dentistry in which the dentist and the dental assistant can both perform operations on the patient. All of the controls are readily accessible. The dental console is constructed in such a manner so that it is relatively inexpensive. In addition, it is constructed so that it has a very pleasing appearance so that it will add to the decor of the dentist's office.

What is claimed is:
1. In a dental console, a cabinet adapted to be connected to at least one source of fluid, at least one dental instrument mounted in the cabinet and adapted to be connected to said source of fluid, means in the cabinet for controlling the supply of fluid to the dental instruments, a tray mounted in said cabinet, one of said dental instruments being adapted to be positioned on said tray, said tray having a relatively large surface disposed in a generally horizontal plane for receiving said one dental in- strument and having a width substantially greater than the width of the dental instrument whereby said one dental instrument can be readily picked up from the tray and placed on the tray by the dentist without the necessity of the dentist watching his hands, said means for controlling the supply of fluid to said dental instrument including switch means associated with said tray whereby when said one of dental instruments is lifted from said tray, said switch means is operated to effect the supply of fluid to said one of dental instruments.

2. A dental console as in claim 1 wherein means is provided for pivotally mounting the tray to permit movement of the tray relative to the switch means about a generally horizontal axis.

3. A dental console as in claim 1 wherein means is provided for mounting said tray for pivotal movement about an axis which is substantially at right angles to the longitudinal axis of the dental instrument placed on the tray, said switch means being positioned so that it is adapted to be engaged by said tray so that when said dental instrument is on said tray, said tray causes said switch means to assume a first condition and so that when the dental instrument is removed from the tray, the tray causes the switch means to assume a second condition.

4. A dental console as in claim 1 wherein said cabinet includes an enclosure having an open front side, caster assemblies mounted on the bottom of the enclosure, a slidable framework slidably mounted in said enclosure for movement between a position within said enclosure and a position substantially out of said enclosure, and means for mounting said tray in said slidable framework.

5. A dental console as in claim 1 wherein a plurality of trays are provided and wherein said trays are arranged side by side.

6. A dental console as in claim 4 together with a control panel mounted on said slidable framework for mounting said means for controlling the supply of fluid to said dental instrument.

7. A dental console as in claim 1 together with a flexible cord connecting said dental instrument to said source of fluid.

8. A dental console as in claim 1 together with a bur tray mounted in said cabinet above said tray.

9. A dental console as in claim 8 wherein said bur tray is substantially V-shaped in cross-section and is mounted in the cabinet for movement between closed and open positions and means associated with the bur tray for retaining the bur tray in either of said open or closed positions.

10. A dental console as in claim 4 together with manifold means mounted on said slidable framework, a flexible cord connecting said dental instrument to said manifold means and means connecting said sources of supply to said manifold means.

11. A dental console as in claim 1 together with a least one additional tray mounted in said cabinet alongside said first named tray for receiving another dental instrument and additional switch means associated with said additional tray whereby when the dental instrument is lifted from the additional tray the additional switch means is operated to effect the supply of fluid to said another dental instrument.

12. In a dental console, a cabinet adapted to be connected to sources of fluid, said cabinet including an enclosure having a front opening, a slidable framework slidably mounted in said enclosure and removable through said front opening between a position within said enclosure and a position substantially out of said enclosure, said slidable framework including a substantially horizontal plate, at least one tray disposed in a generally horizontal plane mounted on said plate to permit movement of the tray about a generally horizontal axis, switch means carried by the plate and adapted to engage said one tray, a dental instrument received by said one tray and serving to move said one tray into a position to operate the switch means to assume one condition, said dental instrument when removed from said one tray serving to permit said one tray to move into a different position to permit the switch means to assume a second condition, a cord for carrying fluids connected to said dental instrument extending downwardly and to the rear of the plate, manifold means connected to the cord, means connecting said manifold means to said sources of fluid, and control means in the cabinet connected to the cabinet and to said switch means operating to energize said switch means when said dental instrument is lifted from said one tray, and means external of said console operative to control the application of fluid to said dental instrument.

13. A dental console as in claim 12 together with additional control means carried by the slidable framework for controlling the type and pressure of fluids supplied to said dental instruments.

14. A dental console as in claim 12 together with a bur tray mounted in said cabinet above said slidable framework.

References Cited

UNITED STATES PATENTS 3,514,171  5/1970  McGaha _____ 32—22 X

ROBERT PESHOCK, Primary Examiner